2,834,694

FRUCTOSE POLYMERS AND METHOD OF PREPARATION

Robert Hill, Richmond, Calif.

No Drawing. Application October 7, 1955
Serial No. 539,292

2 Claims. (Cl. 127—41)

This invention relates to the preparation of fructose polymers from inulin and inulin containing plants; and to the preparation of new polymers of fructose that have molecular weights less than about one-half the molecular weight of inulin and have properties that are markedly different from the properties of either inulin or fructose.

Many plants, such as artichokes and dahlias, contain a polymer of fructose that is known as inulin. Inulin has a starch-like appearance and taste, it is substantially insoluble in cold water but soluble in hot water, and its molecular weight is between about 5000 and 6000, with an average molecular weight of about 5400.

The usual method of preparing inulin from inulin containing plants is described in the National Bureau of Standards Circular C–440. In accordance with the method described therein, the plant is first comminuted, the juice is expressed from the plant, the expressed juice is heated, milk of lime is then added to the heated juice, and finally inulin is separated by precipitation when the juice has cooled. Although this method is widely used, the process is time consuming and low yields of inulin are obtained.

Inulin is commonly employed for preparing fructose by compeletly hydrolyzing the inulin to fructose. Also, inulin is used as a culture media in bacteriology. However, the potentially great value of inulin as a food product is not utilized to the extent that it might be, since the low acid concentration in the human body is not sufficient to produce appreciable hydrolysis of inulin during the time the inulin remains in the digestive system, and there are no inulin-hydrolyzing enzymes present in the body. On the other hand fructose, which may readily be prepared from inulin by hydrolysis with a strong acid or by inulase enzyme, provides a product of high food value. However, fructose is too sweet to be eaten in very large quantities since it is about twice as sweet as glucose.

Summarizing this invention, it comprises the preparation of polymers of fructose from inulin and from inulin containing plants. In accordance with this invention, when an inulin containing plant is employed as the starting point, undesirable compounds are first extracted from the plant by subjecting it to an organic extraction solvent, such as chloroform, that dissolves the bitter alkaloids, and also dissolves the rancidity producing lipids. If it is desired to obtain pure inulin from the fructose polymer plant, or when removal of free sugars from the plant fibers is desirable, an organic solvent, such as ethyl alcohol, that dissolves free sugars, is also employed for extraction of the plant. Additional organic solvents, such as carbon tetrachloride, to aid in dissolving lipids; and solvents for proteins, such as glacial acetic acid, also may advantageously be employed in the extraction solvent.

After the undesirable compounds have been extracted from the inulin containing plant, the inulin may either be left intermixed with the cellulosic fibers of the plant for utilization together with the fibers as a food product, or the inulin may be extracted from the plant fibers by a solvent for inulin, such as warm water. Inulin may then be obtained from the warm water solution by precipitating it from the extraction solvent. Higher yields of inulin from plants are obtained by the extraction method of this invention, in which undesirable compounds are first separated from the inulin containting plant, than are obtained by the common method of expressing all juices from the plant, adding milk of lime to the heated juice, and precipitating inulin from the expressed juice after it has cooled.

The new and distinct fructose polymers of this invention are prepared from inulin alone, or inulin intermixed with plant fibers, by heating the inulin in the presence of a weak acid until formation of a fructose polymer which has the property of being soluble in cold water, is hydrolyzable at below 40° C. by 0.1 N HCl to form fructose, and is not sweet but has a flavor that is nut-like or tasteless. The molecular weights of these new fructose polymers are less than approximately one-half of the molecular weight of inulin when the molecular weights are determined by the same method. In other words, the new fructose polymers of this invention have a molecular weight less than about 2500 compared to an average molecular weight of inulin of about 5400.

The new polymers are valuable as a food product since they are readily hydrolyzed to fructose by 0.1 to 0.2 N HCl, which is the acid concentration found in the human digestive system. Also, since the polymers are not sweet, they may be eaten in relatively large amounts compared to the extremely sweet fructose. Furthermore, when the new polymers of this invention are prepared while still in the cellulosic fibers of the plant, the fibers may be pulverized to form a fructose polymer-containing flour that is useful in baking. If desired, the polymers may be readily separated from the cellulosic fibers by extraction of the fibers with water.

In greater detail, any inulin containing plant, such as the members of the Compositae family, may be employed to obtain fructose polymers therefrom in accordance with this invention. Examples of such plants are *Iris pseudacorus, Scilla maritima, Urginea scilla, Endymion nutans, Inula helenium, Scilla nutans, Scilla pratensis, Scilla cernua, Scilla amoena, Scilla italica, Scilla siberica,* dahlia, globe artichoke, Jerusalem artichoke (girasole), salsify, chicory, burdock, golden rod, dandelion, asparagus, wheat, oats, barley, and roots of the Ti plant. For the commercial production of fructose polymers, the most useful plants are dahlias, globe artichokes, Jerusalem artichokes, salsify, chicory, and Ti plant roots, since such plants contain a relatively high proportion of inulin, and they are readily grown and harvested.

The inulin containing plant is preferably first washed with cold water to remove soil and impurities that are soluble in cold water, and the plant is then cut into thin slices to provide for efficient extraction. Cold water, preferably below 15° C., is employed in the washing step since inulin is substantially insoluble in cold water whereas it is appreciably soluble in warm water. If desired, darkening of the plant caused by peroxidase enzymes in some inulin containing plants, such as salsify, may be prevented by slicing the plant under a spray of cold water acidified to a pH of from about 3 to 4 with a weak, volatile acid, such as acetic acid. However, it has been found that for most inulin containing plants, the use of an acid spray is not essential inasmuch as the plant slices do not darken rapidly.

In order to remove undesirable compounds that are commonly present in inulin containing plants, the plant slices are next subjected to an organic extraction solvent that will not dissolve inulin, but which will extract the undesirable compounds. Inulin is only slightly soluble in organic solvents and thus a single organic solvent or a mixture of liquid organic compounds may be employed without appreciable loss of inulin from the plant. Volatile organic solvents or solvents soluble in cold water are preferably employed since any remaining solvent in the plant slices after the extraction may then readily be removed by evaporation or by washing the slices with cold water.

An organic solvent or mixture of solvents that dissolves alkaloids and lipids is employed in the extraction solvent in all cases regardless of whether or not a pure fructose polymer is to be prepared or the polymer is to be left intermixed with the plant fibers. Alkaloids are bitter in taste and are undesirable in a food product, and lipids cause rancidity. Chloroform, ethyl ether or mixtures of chloroform and ethyl ether are preferred for this purpose since they readily dissolve both alkaloids and lipids.

Also, it is desirable to remove free sugars, such as sucrose, glucose and fructose, from the plant slices by extraction of the plant slices with a liquid organic compound in which such free sugars are soluble, such as alcohols having less than three carbon atoms. Ethyl alcohol is preferred for such purposes since it is a good solvent for free sugars, it does not dissolve inulin, and it is readily available. Methyl alcohol may also be used for removal of free sugars. However, since methyl alcohol is poisonous, it must be completely separated from the plant slices by any convenient means, such as repeated extractions with cold water. The free sugars are water soluble, and thus they are preferably removed in the preparation of inulin or the pure fructose polymer in order to prevent such sugars from being extracted from the plant along with the fructose polymer in the following step. Also, even when the fructose polymer is left in the cellulosic plant fibers and such fibers are ground to form a flour, it is often desirable to extract free sugars if the product is to be eaten by people that are diabetic.

In addition, carbon tetrachloride may be included in the extraction solvent in order to aid the chloroform to dissolve lipids. Also, proteins are advantageously removed from the plant slices by extraction with a solvent for the proteins. Glacial acetic acid, as well as other acids and bases, water, and ethyl alcohol are useful for extracting proteins. However, removal of proteins is not essential when the new polymers of this invention are to be prepared, since the proteins are separated in the hydrolysis step described hereinafter by coagulation of the proteins and removal of the coagulated protein by filtration.

The extraction of undesirable compounds from the inulin containing plant may readily be carried out by agitating the plant slices in a vessel containing the extraction solvent. When more than one organic solvent is used, the compounds may be mixed to form an extraction solvent, or the plant slices may be extracted with each solvent separately. Usually, it is most convenient to employ a single extraction solvent in order to avoid making an unnecessarily large number of extractions.

Sufficient solvent to cover the plant slices is preferably employed, although the amount is not critical as long as enough solvent is used to dissolve undesirable compounds. Agitation of the plant slices in the extraction solvent for a period of five minutes or more insures most complete extraction. However, the time of contact is not particularly critical, and it depends upon the size of the plant slices as well as the number of extractions. Best and most efficient extraction of the plant slices is obtained when several extractions are performed with the organic solvent, rather than only one extraction. The extraction is generally carried out in a closed vessel to prevent loss of the volatile extraction solvent by evaporation. Used extraction solvent can readily be separated from the extracted undesirable compounds by fractional distillation so that the solvent may be reused.

The type and proportions of liquid organic compounds employed in the extraction solvent depend upon the intended use of the inulin in the plant. If the inulin is to be converted into the new fructose polymers of this invention and the polymers left intermixed with plant fibers for use as a flour, only the lipids and alkaloids need be removed by a solvent such as chloroform. Free sugars may be removed if desired. Table I, column (a) gives suitable proportions of preferred liquid organic compounds employed for the extraction of the inulin containing plant in the preparation of such a flour.

In the preparation of pure inulin, all of the foregoing undesirable compounds that are removable by water are extracted from the plant slices before the inulin is separated from the plant by dissolving it in warm water. Column (b) of Table I gives a suitable range of proportions for extraction with the preferred solvents when pure inulin is prepared in accordance with this invention.

When either the new fructose polymers of this invention or pure fructose are prepared from the fructose polymer containing plant, the proteins are readily removed in the hydrolysis step. As a result, it is not necessary to employ a solvent for proteins when proteins are otherwise readily removable. Table I, column (c) gives suitable ranges of proportions of organic compounds in the extraction solvent for preparation of either fructose or the new polymers of this invention.

TABLE I

[Proportions in percent by volume of suitable extraction solvents for preparation of various materials from fructose polymer containing plants.]

| | (a) Flour Containing New Polymer | (b) Inulin | (c) New Polymer of Fructose |
|---|---|---|---|
| | Percent | Percent | Percent |
| Chloroform | 2–100 | 2–49 | 2–50 |
| Ethyl Alcohol | 0–98 | 50–97 | 50–98 |
| Acetic Acid | 0–98 | 1–48 | 0–48 |
| Carbon Tetrachloride | 0–98 | 0–47 | 0–48 |

The proportions given in Table I are not in any way critical since the total amount of all solvents employed may be increased to produce extraction with proportions of solvents that differ from the preferred range specified, as long as some solvent is present for each particular undesirable compound to be extracted. However, the proportions in Table I are preferred for most efficient extraction with a minimum amount of solvent. A specific extraction solvent composition that provides good results for all purposes in terms of percent by volume of the components is 5% chloroform, 75% ethyl alcohol, 5% acetic acid, and 15% carbon tetrachloride.

After each agitation of the plant slices with the extraction solvent, the slices are drained to remove the excess solvent together with the dissolved impurities. Complete removal of the residual extraction solvent or solvents from the plant slices may then be effected by further extraction with a more volatile solvent or by evaporating the remaining solvent by heating the plant slices in a partial vacuum. Removal of the excess extraction solvent by further extraction with volatile solvents is preferred for the preparation of pure inulin, since the solvents do not remove or hydrolyze any of the inulin.

Ethyl ether and acetone are examples of volatile solvents that rapidly evaporate from the drained slices after they have been used to remove the initial extraction solvent.

When the new polymers of this invention are prepared, either extraction, or heat together with a partial vacuum may be utilized to remove the extraction solvent remaining in the plant slices. Temperatures up to 130° C. may be employed for this purpose if additional weak acid is to be added to the plant slices in the hydrolysis step. Such temperatures cause partial hydrolysis of inulin in the plant slices if weak acid from the extraction solvent still remains in the plant slices, but this hydrolysis does not reduce the yield of the new polymers of this invention. Temperatures above 130° C. are undesirable since they cause decomposition of the inulin. If it is desired to utilize weak acid remaining from the extraction solvent for carrying out the complete hydrolysis of inulin into the polymers of this invention while removing the other components of the extraction solvent, a partial vacuum together with a temperature of 60° C. or below is preferably employed. The other extraction solvents are rapidly removed under such conditions and the weak acids remain in the plant slices, since the weak acids usually employed are not appreciably volatile at temperatures below 60° C.

Inulin may be separated from the plant slices by extracting the slices with warm water. The solubility of inulin in grams per 100 ml. of water is 0.01 at 0° C., 0.02 at 14° C., 0.27 at 30° C., 1.57 at 60° C., 4.00 at 80° C. and 36.5 at 100° C. Consequently, it is apparent that inulin is not appreciably removed by contact with cold water but is extracted by warm water. Best results in extraction of inulin from the plant slices is obtained by using water at a temperature of between 70° C. and 95° C. for the extraction step. Several extractions produce more complete removal of the inulin than a single extraction, and thus the extraction is preferably repeated several times.

The preparation of pure inulin from the warm water solution of inulin is accomplished by precipitating inulin from the water solution after the water has cooled. The inulin may be precipitated by reducing the volume of the water extract to a fraction of its original amount by means of a partial vacuum and heat, and then slowly cooling the resulting more concentrated solution of inulin to room temperature or preferably below room temperature, in order to precipitate the inulin. As an alternative, the inulin may readily be precipitated from the cooled original extract solution without evaporation by adding ethyl alcohol or methyl alcohol until no more inulin precipitates. The precipitate may be separated from the solution by evaporating the solution or by filtration.

The inulin precipitate is easily purified by washing the precipitate with cold water. The cold water does not dissolve the inulin, but it does remove water soluble compounds that were extracted from the plant slices along with the inulin and which became occluded within the inulin precipitate. Finally, the inulin precipitate is dried in any conventional manner, such as by the use of heat or vacuum, to provide inulin powder.

The new fructose polymers of this invention are prepared from higher polymers of fructose, such as inulin, by applying heat in the presence of a weak acid. This combination of factors results in the partial hydrolysis of the higher fructose polymer into the present polymers, which have a chain length and molecular weight less than about one-half that of inulin. If either the weak acid without heat is employed, or heat alone is used, inulin will not be converted into the new polymers of this invention to any substantial degree nor will the inulin be hydrolyzed. When a strong acid, such as sulfuric, is used under the conditions of this invention in place of the weak acid, the inulin is converted directly into fructose by complete hydrolysis.

Higher fructose polymers, such as inulin, may be converted into the new polymers of this invention while still intermixed with the cellulosic plant fibers. The resultant product may then be ground to form a flour for use in baking, or the new polymer may be extracted from the cellulosic fibers by water. Also, either commercially available inulin or inulin prepared from inulin containing plants by the method described herein, is useful as a starting point.

The inulin is preferably subjected to contact with a weak acid during preparation of the polymers of this invention by moistening the inulin with acid of the desired concentration to form a paste, or by subjecting the polymer to steam containing the acid. Also, if desired the inulin can be dissolved in a weak acid and the solution heated to produce the new fructose polymers.

A useful method of subjecting the inulin to a weak acid is to wrap the inulin in filter paper, soak the package in weak acid of the desired concentration, drain off the excess solution, and heat the moist inulin package in a suitable container, such as a beaker with a watch glass for a lid in order to maintain an acidic atmosphere.

Any acid that is weak, or in other words substantially less than completely dissociated in dilute aqueous solutions, may be employed. Weak acids that are either very volatile, or that may be extracted with a solvent which does not dissolve the new polymers of this invention are preferred since such weak acids are readily separated from the fructose polymers. Organic acids are particularly suitable for partially hydrolyzing inulin in accordance with this invention. Examples of such preferred organic acids are acetic acid, formic acid and lactic acid. These water soluble, volatile organic acids are weak and they can be prepared in dilute aqueous solutions. Also, the volatility of organic acids enables them to be readily separated from the hydrolyzed product by evaporation. Weak inorganic acids, such as boric acid, nitrous acid, and hypochlorous acid are also suitable. Such inorganic acids may be separated from the new polymers of this invention by extracting the polymers with a 90% aqueous solution of ethyl alcohol. The weak inorganic acids are dissolved in the alcohol, and the new polymers of this invention are substantially insoluble in 90% ethyl alcohol.

The concentration of weak acid employed for the partial hydrolysis of inulin in accordance with this invention is not critical and may be between about 0.05% and 100% by volume of acid in a water solution, depending upon the temperature of hydrolysis and the molecular weight range of fructose polymer desired. Generally, the higher the acid concentration and the higher the temperature of hydrolysis, the lower the molecular weight range of the resultant polymers formed from inulin. Conversely, with low acid concentrations and low temperatures of hydrolysis, the polymers of fructose formed generally have a molecular weight about one-half the molecular weight of inulin. With acid concentrations below about 0.05% by volume, hydrolysis of inulin to the polymers of this invention is very slow even at a temperature of 130° C.

Any temperature between about 30° C. and 130° C. may be employed for preparing the new polymers of this invention from inulin. If temperatures above 130° C. are used, the polymer tends to become caramelized. Temperatures below 30° C. do not produce appreciable hydrolysis of inulin even with concentrated solutions of weak acids. No measurable transformation of inulin into the fructose polymers of this invention was obtained with a weak acid at 25° C.

The time required for substantial hydrolysis of inulin into the polymers of this invention varies with the temperature and acid concentration employed. Any period of from about one minute up to two hours and more was found satisfactory depending upon the conditions of hydrolysis. Generally at a specific temperature and acid concentration, the percent of inulin converted into the polymers of this invention increases with the passage of time up to a maximum percentage, and then decreases.

Table II illustrates the percent conversion of inulin into the polymers of this invention with variations in heating time and acid concentration. The tests were conducted by wrapping inulin in filter paper, soaking the package thus formed in acetic acid in the concentration indicated, draining the excess fluid from the package, depositing the package in a beaker covered by a watch glass, and placing the beaker containing the inulin package in an oven at 80° C. for the period specified.

After heating the package, ethyl ether was employed to extract the residual acid from the treated inulin material, and to speed up the drying, since ethyl ether does not dissolve either inulin, the fructose polymers of this invention, or any free sugar monomers, such as fructose. Free sugars then were removed from the heated inulin by extraction with 95% ethyl alcohol at 25° C., which dissolves free sugars, but does not dissolve either the fructose polymers of this invention or inulin. The 95% alcohol extract was then evaporated to dryness, and the free hexose was determined from an aliquot portion of the residue by the standard laboratory method of Somogyi as modified by Nelson.

A second extraction of the partially hydrolyzed inulin or plant tissues was then made with 70% ethyl alcohol at 25° C., which dissolves the polymers of this invention but does not dissolve inulin. The alcohol in this extract was evaporated to dryness to provide a powder of the new polymers of this invention. The powder was then dissolved in water, and transferred to a volumetric flask. An aliquot portion of the solution was tested for free hexose by the method of Somogyi-Nelson previously mentioned, and by this procedure the reducing value of the polymers of this invention was obtained. Another aliquot portion of the hydrolyzed inulin that had been dissolved in the 70% ethyl alcohol extraction was hydrolyzed completely by adding sufficient sulfuric acid to form a 2 Normal solution and heating the solution at 100° C. for one hour. The solution hydrolyzed by the sulfuric acid, was then neutralized with sodium carbonate, and the amount of hexose was determined by the method of Somogyi-Nelson. This amount divided by the weight of inulin hydrolyzed gives the percent conversion of inulin into the new polymers of this invention.

Molecular weights were calculated on the basis that both inulin and the new polymers of this invention are straight chain polymers of fructose ending in a single sugar group which has reducing properties. Thus, before hydrolysis each mole of the new polymer has a reducing value equal to one mole of fructose, and the total number of moles of new polymer present in an aliquot portion is provided by the dividing of the reducing value weight in terms of free sugar before hydrolysis, by the molecular weight of fructose. The molecular weight is then obtained by dividing the weight of new polymer present (as determined by the reducing value of the aliquot portion hydrolyzed with sulfuric acid) by the number of moles of new polymer present.

For example, a sample of inulin was hydrolyzed by a solution of 25% by volume acetic acid at 120° C. for 60 minutes. The reducing value of the polymer obtained by extraction with 70% ethyl alcohol in the manner previously outlined was 2.45 grams. The reducing value of an aliquot portion after hydrolysis with $H_2SO_4$ was 13.6 grams.

$$\text{Moles polymer} = \frac{2.45 \text{ grams}}{180 \text{ molecular weight fructose}} = 0.0136$$

$$\text{Molecular wt. polymer} = \frac{13.6 \text{ grams}}{0.0136 \text{ mole polymer}} = 1000$$

TABLE II

[Conversion of inulin into new polymers by acetic acid at 80° centigrade.]

| Acid Concentration in Percent by Volume | Heating Time in Minutes | Percent Conversion into Lower Polymers | Molecular Weight [1] |
|---|---|---|---|
| 0 | 0 | 2.2 | |
| 0 | 5 | 3.6 | |
| 0 | 15 | 2.9 | |
| 0 | 30 | 4.9 | |
| 0 | 60 | 4.2 | |
| 0 | 120 | 3.7 | |
| 5 | 0 | 4.8 | |
| 5 | 5 | 95.0 | 2,000–2,500 |
| 5 | 15 | 70.2 | |
| 5 | 30 | 42.1 | |
| 5 | 60 | 41.3 | |
| 5 | 120 | 26.9 | |
| 10 | 0 | 7.1 | |
| 10 | 5 | 92.9 | 720–760 |
| 10 | 15 | 93.8 | 720–760 |
| 10 | 30 | 30.1 | |
| 10 | 60 | 29.4 | |
| 10 | 120 | 27.7 | |
| 50 | 0 | 8.8 | |
| 50 | 5 | 70.5 | |
| 50 | 15 | 69.9 | |
| 50 | 30 | 98.2 | 340–400 |
| 50 | 60 | 87.1 | 340–400 |
| 50 | 120 | 44.4 | |
| 100 | 0 | 9.9 | |
| 100 | 5 | 97.6 | 340–400 |
| 100 | 15 | 100 | 340–400 |
| 100 | 30 | 98.4 | 340–400 |
| 100 | 60 | 93.9 | 340–400 |
| 100 | 120 | 80.2 | 340–400 |

[1] The molecular weights of the new polymers of this invention obtained by the hydrolysis are listed only for acid concentrations and times that provided a high percent of conversion of inulin into the polymers of this invention.

The percent of conversion of inulin into lower polymers of fructose varies with the temperature when the other variables are held constant. Also, the temperature has an effect upon the molecular weight of the fructose polymer that formed.

For example, at 40° C. only a small amount of inulin was hydrolyzed into the new polymers of this invention at acid concentrations below 15% by volume, and the fructose polymers produced generally had a molecular weight between 2000 and 2500. With an acid concentration of 25% by volume at 40° C., more than 90% of inulin was converted into a polymer of fructose having a molecular weight range between 2000 and 2500 when hydrolysis times between 5 minutes and 120 minutes were employed. An acetic acid concentration of 100% at 40° C. provided over 90% of conversion to a fructose polymer having a molecular weight between 2000 and 2500 when the hydrolysis was continued for between 20 minutes and 100 minutes, but at 15 minutes and also at 120 minutes the percent of lower polymers of fructose formed was only about 65%.

When a temperature of 120° C. was employed for hydrolyzing inulin by the method previously specified, a fructose polymer having a molecular weight between 2000 and 2500 was obtained in a yield greater than 90% with periods of from 3 to 40 minutes employed for hydrolysis. At the same 120° C. temperature, 50% by volume acetic acid provided 95.9% conversion of inulin into a fructose polymer having a molecular weight between 340 and 400 when a period of 60 minutes was employed for the hydrolysis, but only a 40% yield was obtained with a 5 minute period of hydrolysis.

It is apparent that the conditions of hydrolysis, such as the temperature, acid concentration and time of hydrolysis effect both the amount of inulin hydrolyzed to lower polymers of fructose, and the molecular weight of the polymers that are formed. Also, the manner of subjecting the inulin to the weak acid has an effect upon the hydrolysis. For example, 57.2% of inulin was hydrolyzed when the inulin was wrapped in filter paper, moistened in 5% by volume acetic acid, placed in a beaker with a watch glass and heated in an oven at a temperature of 120° C. for 5 minutes. However, 100.0% of the inulin was hydrolyzed into fructose polymers having a molecular weight less than one-half the molecular weight of fructose when the fructose was heated in an autoclave for 5 minutes at 15 pounds per square inch gauge pressure (120° C.) in a moist atmosphere of 5% by volume acetic acid. The optimum conditions for obtaining the highest yields of inulin for any temperature, acid concentration or time are readily determined by the method previously described for obtaining the data listed in Table II.

The resultant new polymers of this invention are stable at atmospheric conditions and are quite different in properties both from previously known polymers of fructose, and from fructose itself. They are very useful as a food product because they are readily hydrolyzed to fructose by acids in the human digestive system at body temperature within the time that foods usually remain in the stomach (0.5–2 hours), and yet they are unsweet and do not have the sweet taste that prevents fructose from being eaten in large quantities. Also, if desired, the new polymers can be employed as a readily available source of fructose by hydrolysis of the polymers. Polymers of fructose having molecular weight ranges of 2000 to 2500, 925 to 1050, 720 to 760, 550 to 570, and 340 to 400 have been prepared and identified by the method of this invention. Thus it can be seen that the new polymers contain from 2 to about 14 molecules of fructose in their polymeric chains. The polymers having a molecular weight range of 2000 to 2500 had a nutty flavor but the lower polymers were tasteless.

Table III summarizes important properties of the new polymers, and clearly illustrates that they are different from inulin and fructose. It can be seen that as a food product, the new polymers of this invention have properties that render them far more valuable than either inulin or fructose.

TABLE III

|  | Inulin | New Polymers | Fructose |
|---|---|---|---|
| Molecular Weight | 5,400 | 2,500–340 | 180.16. |
| Appearance | White Powder. | White Powder. | White Crystals. |
| Taste | Nutty | Nutty or Tasteless. | Sweet. |
| Solubility in Water at 20° C. | Insoluble | Soluble | Soluble. |
| Solubility in 70% Ethyl Alcohol (aqueous solution). | do | do | Do. |
| Solubility in 95% Ethyl Alcohol (aqueous solution). | do | Insoluble | Do. |
| Solubility in Chloroform | do | do | Insoluble. |
| Hydrolyzed to Fructose by 0.1 N HCl at 37° C. in 1 hour. | No | Yes | |

The following are specific examples of the preparation of polymers of fructose from inulin containing plants. In all the specific examples the starting material was fresh girasole (Jerusalem artichoke) slices. Alkaloids, lipids, free sugars and acid soluble proteins were removed by extracting five kilograms of girasole that had been sliced into 1/32 inch wide slices, with 20 liters of a solvent mixture containing 1% acetic acid, 75% ethyl alcohol, 5% chloroform and 19% carbon tetrachloride. After the extraction, the slices were drained of solvent.

*Example 1*

25 grams of the extracted girasole slices was extracted with ethyl ether to remove acetic acid. Inulin was then removed by extracting the slices three times by agitating them in hot water at a temperature of 90° C. A total of 250 cc. of water was employed for the extraction. The slices were then discarded, and the water extract, which contained the inulin, was retained.

The volume of the water extract was reduced by evaporation to about 25 cc. by means of a reduced pressure of 5 pounds per square inch gauge pressure, and at a temperature of 45° C. The water extract was then cooled to about 5° C. and left standing overnight, during which time inulin precipitated from the cool concentrated solution. The inulin precipitate was then filtered and washed two times with cold water at a temperature of 15° C. After washing the precipitate was dried at a temperature of 45° C.

The yield of inulin from the 25 grams of slices was 2 grams, or in other words 8% of the weight of the girasole slices. The inulin was then wrapped in filter paper, the package was moistened with a 1% by volume solution of acetic acid, and then the moistened inulin was placed in an oven at a temperature of 120° C. in the presence of a beaker containing 1% acetic acid. After a period of 5 minutes the inulin was withdrawn from the oven. Free sugars were first removed by extraction of the treated inulin with 95% ethyl alcohol, and the new polymers were separated from the inulin by extraction with 70% ethyl alcohol. The alcohol was evaporated to leave the new polymer deposited in the form of a white powder. 94.2% of the inulin was converted to a new polymer of fructose having a molecular weight range of 2000–2500.

*Example 2*

25 grams of the slices extracted with the organic solvent mixture as previously described were then extracted with ethyl ether in order to remove acetic acid. Next the slices were extracted by agitating them in hot water at a temperature of 90° C. to dissolve the inulin that was in the slices. A total of 250 cc. of water was used in the extraction, and three extractions were carried out.

The warm extraction water was cooled to 15° C., and inulin was precipitated by adding ethyl alcohol until no additional precipitate formed. The precipitate was then filtered and washed with cold water at 15° C. After washing, the precipitate was dried at a temperature of 40° C. A total of 1.74 grams of inulin or 7.0% by weight of the extracted slices was obtained by this alternative method of precipitating inulin.

The inulin was divided into two portions. One-half of the first portion was placed in 10 cc. of 6 N $H_2SO_4$ and heated at 100° C. for one hour. The resultant solution was neutralized with sodium carbonate and clarified with charcoal. The inulin was completely hydrolized with fructose under these conditions as determined by the standard Roe method of determining fructose.

Another one-half of the first portion of inulin was placed in 10 cc. of 0.15 N HCl and heated at 37.5° C. for one hour. The resultant solution was neutralized with sodium carbonate and clarified with charcoal. None of the inulin was converted to fructose under these conditions.

The second portion of the inulin was moistened with a 50% by volume solution of acetic acid, wrapped in metal foil, and heated in an oven for 60 minutes at 40° C. The resultant product was extracted with 95% ethyl alcohol to remove free sugars. Cold water at 15° C. was employed to extract the new polymer. The water was evaporated to provide a yield of about 95.2% by weight of the inulin converted into a new polymer of this invention having a molecular weight range of about 2000 to 2500. One-half of the new polymer was dissolved in 10 cc. of 6 N $H_2SO_4$ and heated at 100° C. for one hour. The resultant solution was neutralized with sodium carbonate and clarified with charcoal. All of the new polymer was converted into fructose under such conditions.

The other one-half of the new polymer was dissolved in 10 cc. of 0.15 N HCl and heated at 37.5° C. for one hour. The resultant solution was neutralized with sodium carbonate and clarified with charcoal. Substantially all of the new polymer was converted into fructose under these conditions.

Consequently, it is apparent that the new polymer is converted into fructose either in the presence of a strong acid at elevated temperatures or in the presence of 0.15 N HCl at 37.5° C. This differs appreciably from inulin, which is converted by a strong acid at 100° C. into fructose, but which is not hydrolyzed by 0.15 N HCl at 37.5° C. within an hour's time.

*Example 3*

4 kilograms of the slices extracted with the organic solvent as described previously, were heated in an oven at 80° C. for 15 minutes in the presence of 10% by volume aqueous solution of acetic acid to produce a new fructose polymer of this invention while the polymer remained in the fibers of the plant slices. The slices were extracted with ethyl ether to remove residual acetic acid, and dried at 120° C. The dried slices were then ground to flour consistency. A portion of the flour was employed for making a dough from which bread was made. The new polymer of the invention was extracted from another portion of the flour after free sugars had first been removed by 95% ethyl alcohol. The flour was agitated with cold water at 15° C. the water extract was filtered and evaporated to leave a new polymer of this invention as a residue. The new polymer had a molecular weight of about 720–760, it was tasteless, and it was in the form of a white powder.

I claim:

1. The method of preparing a polymer of fructose from inulin which comprises heating said inulin at a temperature of between about 30° C. and 130° C. for more than one minute in contact with a 0.05% to 100% by volume aqueous solution of a weak acid to form a polymer of fructose having a molecular weight between about 340 and 2500, having the property of being soluble in cold water, being substantially hydrolyzable by 0.1 N HCl at below 40° C. to form fructose, and having an unsweet flavor.

2. The method of claim 1 in which the weak acid is acetic acid.

References Cited in the file of this patent

UNITED STATES PATENTS

| | | |
|---|---|---|
| 1,616,164 | Arsem | Feb. 1, 1927 |
| 1,616,167 | Arsem | Feb. 1, 1927 |
| 1,763,080 | Arsem | June 10, 1930 |
| 2,555,356 | Marchand | June 5, 1951 |